US007604246B2

(12) United States Patent  (10) Patent No.: US 7,604,246 B2
Sodemann et al.  (45) Date of Patent: Oct. 20, 2009

(54) FRAME FOR AN VERTICAL SHAFT ENGINE-DRIVEN ASSEMBLY

(75) Inventors: Wesley C. Sodemann, Dousman, WI (US); Billy Brandenburg, Horicon, WI (US)

(73) Assignee: Briggs and Stratton Corporation, Wauwatosa, WI (US)

( * ) Notice: Subject to any disclaimer, the term of this patent is extended or adjusted under 35 U.S.C. 154(b) by 756 days.

(21) Appl. No.: 11/159,890

(22) Filed: Jun. 23, 2005

(65) Prior Publication Data

US 2006/0290084 A1 Dec. 28, 2006

(51) Int. Cl.
B62B 1/12 (2006.01)
(52) U.S. Cl. ............................. 280/47.315; 280/47.131; 280/47.17; 280/47.24
(58) Field of Classification Search ............ 280/47.131, 280/47.17, 47.2, 47.24, 47.315, 655.1, 47.34, 280/47.371
See application file for complete search history.

(56) References Cited

U.S. PATENT DOCUMENTS

| 2,684,495 | A | * | 7/1954 | Litkenhous | ................. | 15/49.1 |
| D223,039 | S | * | 2/1972 | Widmer | ........................ | D15/7 |
| 3,827,707 | A | | 8/1974 | Bierman | | |
| D243,282 | S | * | 2/1977 | Burenga | ........................ | D15/9 |
| 4,625,949 | A | | 12/1986 | Walker | | |
| 4,768,930 | A | | 9/1988 | Grime et al. | | |
| 4,785,997 | A | | 11/1988 | Liska et al. | | |
| 4,824,137 | A | | 4/1989 | Bolden | | |
| 4,826,202 | A | | 5/1989 | Morrissette | | |
| 4,865,255 | A | | 9/1989 | Luvisotto | | |
| 5,054,740 | A | | 10/1991 | Wheeler | | |
| 5,073,092 | A | * | 12/1991 | Gebauer et al. | ............. | 417/383 |
| 5,167,306 | A | * | 12/1992 | Carrigan, Jr. | ............... | 190/18 A |
| 5,217,238 | A | * | 6/1993 | Cyphers et al. | .......... | 280/47.18 |
| 5,265,895 | A | | 11/1993 | Barrett | | |
| 5,299,767 | A | | 4/1994 | Simpson | | |
| 5,322,307 | A | | 6/1994 | Tilton et al. | | |
| 5,397,151 | A | * | 3/1995 | Jserng | ........................ | 280/654 |
| 5,429,306 | A | | 7/1995 | Schneider et al. | | |
| 5,441,297 | A | | 8/1995 | Krohn et al. | | |
| 5,489,109 | A | * | 2/1996 | Murphy | ................... | 280/415.1 |
| 5,700,137 | A | | 12/1997 | Simonette | | |
| 5,965,999 | A | * | 10/1999 | Frank | ............................. | 322/1 |
| 6,022,032 | A | | 2/2000 | Savage | | |
| 6,220,240 | B1 | * | 4/2001 | Grady et al. | ................. | 126/519 |
| D444,279 | S | * | 6/2001 | Kristiansen et al. | .......... | D34/12 |
| 6,310,404 | B1 | | 10/2001 | Frank | | |

(Continued)

Primary Examiner—Christopher P Ellis
Assistant Examiner—Vaughn T Coolman
(74) Attorney, Agent, or Firm—Michael Best & Friedrich LLP

(57) ABSTRACT

An engine-driven assembly including an engine-driven device, a vertical-shaft engine, a frame, and a handle. The vertical-shaft engine supplies power to the engine-driven device. The frame is coupled to the vertical-shaft engine and the engine-driven device. The frame includes at least one frame foot in contact with a ground surface when the frame is in an operating position. The handle has legs coupled for to the frame for movement of the handle between retracted and extended positions. The legs are oriented such that an acute angle is formed between the ground surface and the legs when the handle is extended and the engine-driven assembly is in the operating position. The handle is higher in the extended position than in the retracted position.

23 Claims, 5 Drawing Sheets

U.S. PATENT DOCUMENTS

| | | |
|---|---|---|
| 6,313,543 B1 | 11/2001 | Frank |
| 6,368,474 B1 | 4/2002 | Wilkins |
| 6,582,201 B2 * | 6/2003 | Lucchi ............... 417/234 |
| 6,648,603 B2 | 11/2003 | Dexter et al. |
| 6,695,235 B2 | 2/2004 | Faller et al. |
| 6,742,995 B1 | 6/2004 | Wood et al. |
| 6,779,987 B2 | 8/2004 | Dexter et al. |
| 6,923,627 B1 * | 8/2005 | Wood et al. ............. 417/234 |
| 6,935,642 B1 * | 8/2005 | Craig et al. ............. 280/47.24 |
| 6,952,056 B2 * | 10/2005 | Brandenburg et al. ....... 290/1 A |
| 6,998,725 B2 * | 2/2006 | Brandenburg et al. ....... 290/1 A |
| 7,128,344 B2 * | 10/2006 | Sharp ............... 280/830 |
| 7,222,865 B2 * | 5/2007 | Chen et al. ............. 280/30 |
| 7,240,909 B2 * | 7/2007 | Robens ............... 280/47.24 |
| 2001/0033794 A1 | 10/2001 | Dexter et al. |
| 2002/0122730 A1 | 9/2002 | Dexter et al. |
| 2003/0080222 A1 | 5/2003 | Faller et al. |
| 2004/0046342 A1 | 3/2004 | Lin |
| 2004/0079411 A1 | 4/2004 | Davis |
| 2004/0084880 A1 | 5/2004 | Kim |
| 2004/0175278 A1 | 9/2004 | Dexter et al. |
| 2006/0273537 A1 * | 12/2006 | Robens ............... 280/47.24 |

* cited by examiner

FRAME FOR AN VERTICAL SHAFT ENGINE-DRIVEN ASSEMBLY

FIELD OF THE INVENTION

The present invention relates to engine-driven assemblies, and more particularly to frames for supporting the engine-driven assemblies.

BACKGROUND OF THE INVENTION

Engine-driven assemblies are well known in the art to transfer the energy of a power unit to a piece of equipment that uses the energy of the power unit to perform a specific function. For example, a pressure washer has a power unit, such as an engine, to provide energy to a pump for dispensing pressurized fluid. In a pressure washer, the engine can be a vertical shaft engine with a vertical crankshaft attached to a rotary pump. Pressure washers, as well as other engine-driven assemblies, often need to be transported to reach desired locations.

SUMMARY OF THE INVENTION

In one embodiment, the invention provides an engine-driven assembly. The engine-driven assembly includes an engine-driven device, a vertical-shaft engine, a frame, and a handle. The vertical-shaft engine supplies power to the engine-driven device. The frame is coupled to the vertical-shaft engine and the engine-driven device. The frame includes at least one frame foot in contact with a ground surface when the frame is in an operating position. The handle has legs coupled for to the frame for movement of the handle between retracted and extended positions. The legs are oriented such that an acute angle is formed between the ground surface and the legs when the handle is extended and the engine-driven assembly is in the operating position. The handle is higher in the extended position than in the retracted position.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

DETAILED DESCRIPTION

Figure 1:
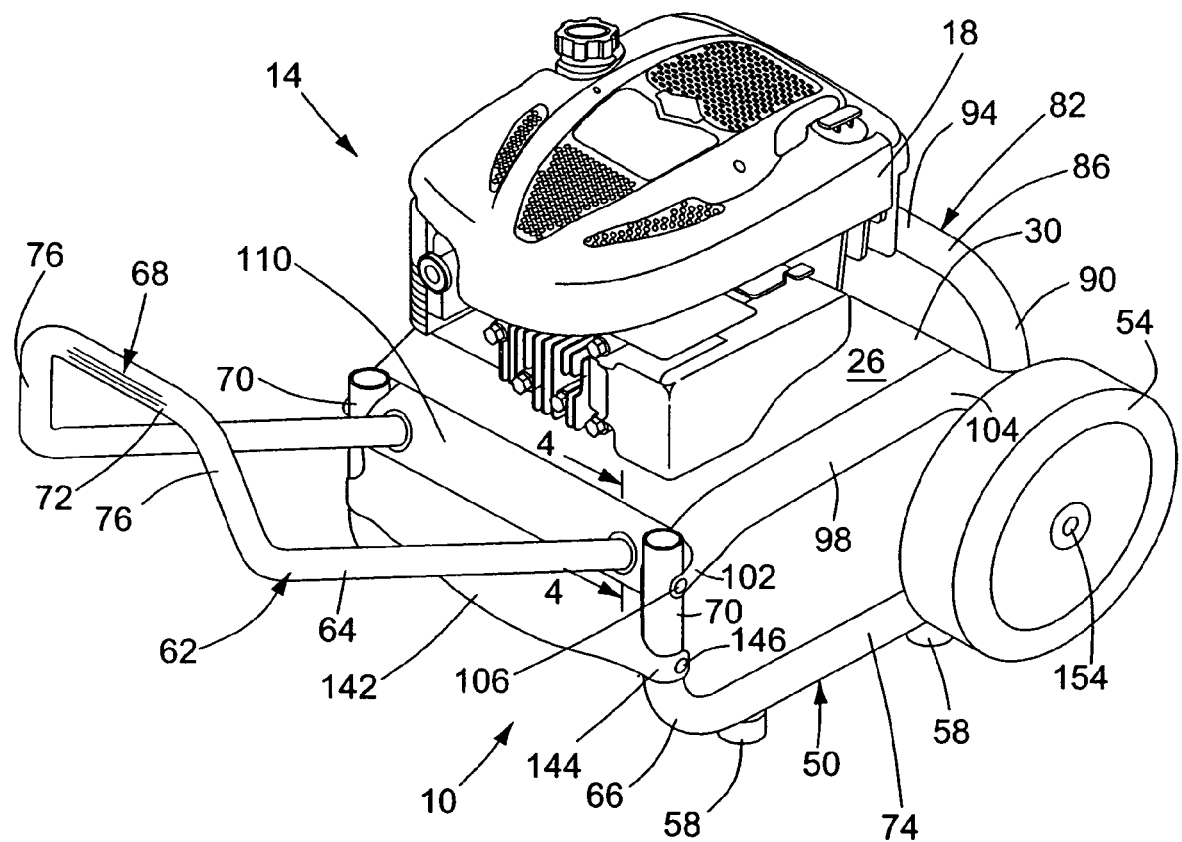
FIG. 1 is a perspective view of a portable frame supporting an engine-driven assembly according to one embodiment of the invention.
Figure 2:
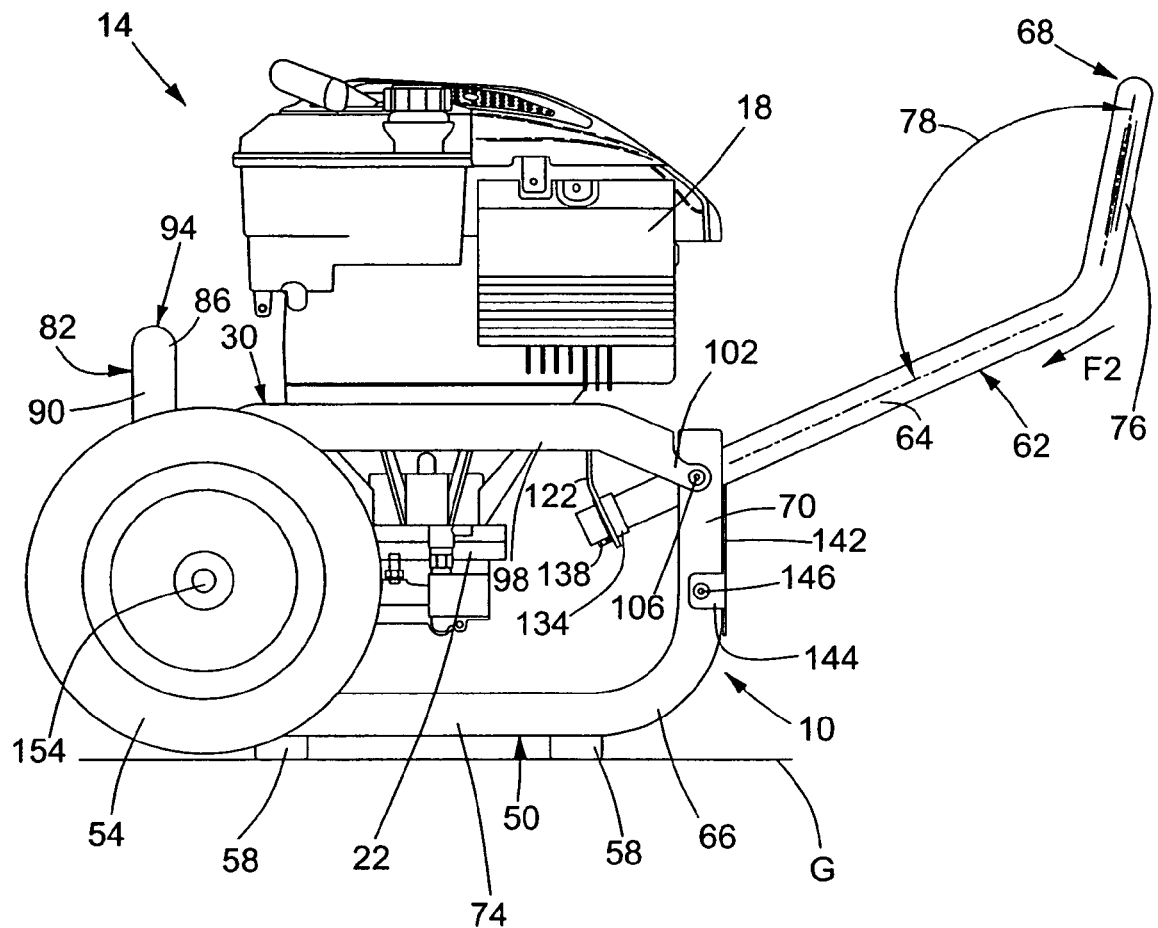
FIG. 2 is a side view of the portable frame supporting the engine-driven assembly shown in FIG. 1, illustrating the handle in an extended position.
Figure 3:
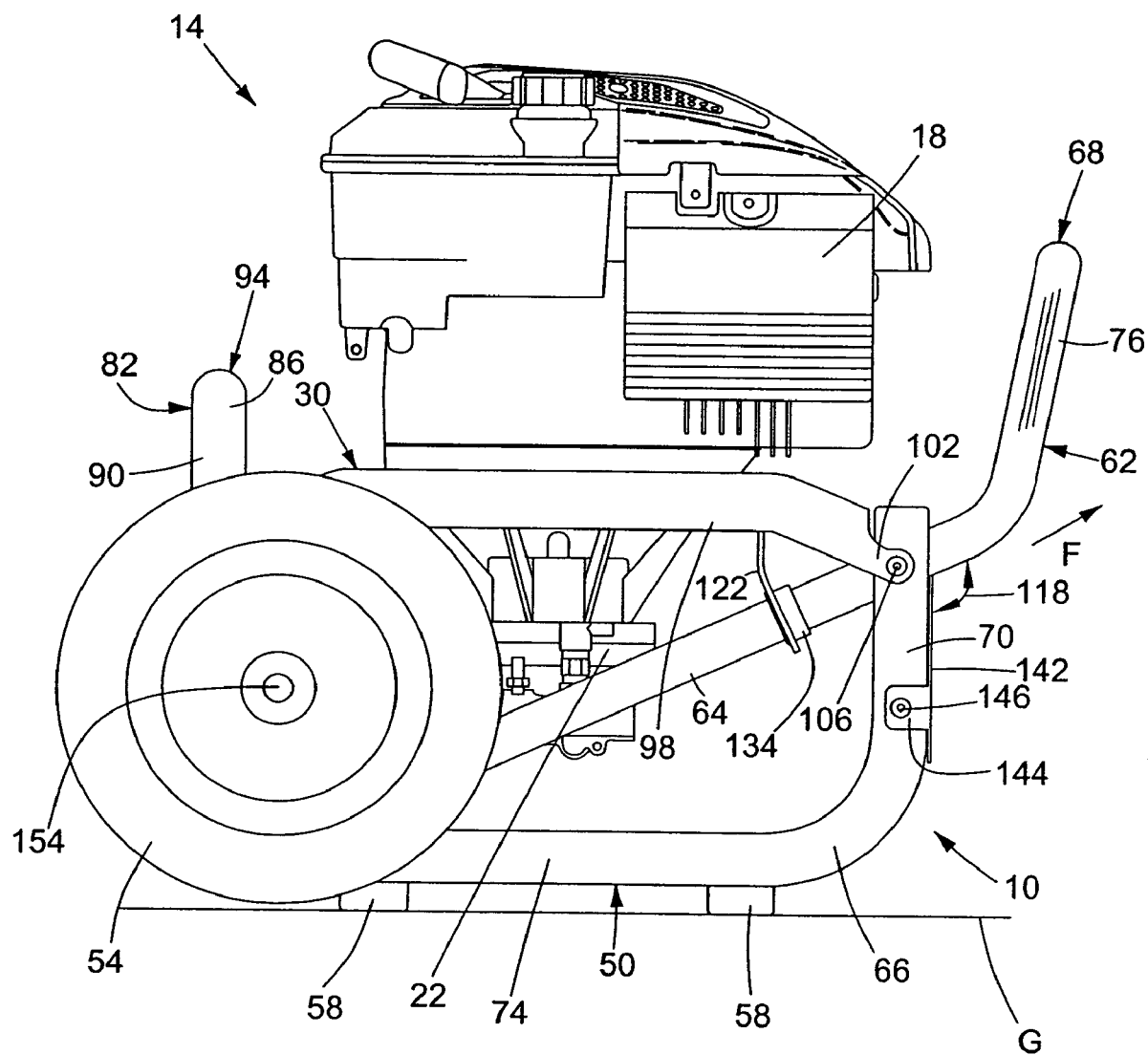
FIG. 3 is another side view of the portable frame supporting the engine-driven assembly shown in FIG. 2, illustrating the handle in a retracted position.

FIGS. 1-3 illustrate an engine-driven assembly including a portable frame 10. In the illustrated embodiment, the engine-driven assembly is a pressure washer 14. The pressure washer 14 includes a power unit, such as a vertical-shaft engine 18, to drive a rotary pump 22 that receives liquid from a source and delivers pressurized liquid to a rigid wand or other conduit (not shown). The frame 10 is used to support the engine 18 and pump 22 and facilitates the transport of the pressure washer 14. In other embodiments, the engine-driven assembly can be a generator or a compressor. In addition, the engine 18 may be a horizontal-shaft engine and the pump 22 can be any type of positive displacement or impeller-type pump.

As illustrated in FIG. 1, the frame 10 includes a mounting plate 30 having an upper surface 26 and a lower surface (not shown). The engine 18 is coupled to the mounting plate 30 adjacent the upper surface 26 and the pump 22 is coupled to the mounting plate 30 adjacent the lower surface. The pump 22 is operatively coupled to the vertical crankshaft (not shown) of the engine 18 such that the crankshaft of the engine 18 drives the pump 22.

The frame 10 also includes a support 50, wheels 54, feet 58, and a handle 62. In the embodiment illustrated in FIGS. 1-3, the support 50 is made of a single, cylindrical, hollow tube. In other embodiments, the support 50 can be made of a solid or hollow piece of material having a circular, square, triangular, elliptical, or oval cross-section, or a combination thereof. The support 50 can be constructed of a plurality of materials, including without limitation steel, aluminum, wood, rigid plastic, and other types of synthetic or non-synthetic materials, and any blend or combination thereof.

The support 50 has two front bends 66 on the side of the frame 10 with the handle 62. Two arms 70 extend upwardly from the bends 66 and two base portions 74 extend rearwardly from the bends 66. The arms 70 are generally perpendicular to the base portions 74. The support 50 has two rear bends (not shown) on the opposite ends of the base portions 74. The rear bends lead into a bumper 82. The bumper 82 includes two bends 86, two vertical bumper arms 90 connecting the bends 86 and rear bends, and a horizontal bumper bar 94 connecting the bends 86.

The mounting plate 30 is connected to the support 50 and is made from formed sheet steel. The mounting plate 30 also includes two side panels 98 to aid in attaching the mounting plate 30 to the support 50. The side panels 98 have tabs 102 extending toward the arms 70 of the support 50. The side panels 98 also include tabs 104 (shown in FIG. 1) that extend toward bumper arms 90. Apertures (not shown) in the tabs 102, 104 allow for conventional fasteners 106 to be inserted through the tabs 102, 104 and into the arms 70, 90 to aid in the coupling of the mounting plate 30 to the support 50. A front panel 110 extending from the mounting plate 30 is illustrated in FIG. 1. The front panel 110 extends downwardly from the mounting plate 30 and includes two apertures for receiving the handle 62.

As shown in FIG. 1, a flat panel 142 is provided below the front panel 110 between the arms 70 of the support 50. The flat panel 142 has tabs 144 that extend around a portion of the front arms 70. The tabs 144 have apertures that allow conventional fasteners 146 to couple the flat panel 142 to the front arms 70 of the support 50. The flat panel 142 serves to prevent bending of the frame 10 due to excess torque on the frame 10. In addition, the flat panel 142 provides additional support to the frame 10.

As illustrated in FIG. 1, the handle 62 is a generally U-shaped tubular member having two legs 64 connected by a cross-portion 68. The cross-portion 68 includes a straight section 72 and angled sections 76 connecting the ends of the straight section 72 with the legs 64. The straight section 72 can be used as a gripping location for the user. The legs 64 are generally oriented normal to the straight section 72 and extend in a common direction from the straight section 72. As shown in FIG. 2, an angle 78 is defined between the legs 64 and the angled sections 76. In some embodiments, the angle 78 between the legs 64 and the angled section 76 is between 95 and 165 degrees. In other embodiments, the angle 78 between the legs 64 and the angled section 76 is between 115 and 145 degrees. In the illustrated embodiment, the angle 78 between the legs 64 and the angled section 76 is approximately 50 degrees. The legs 64 extend through the apertures in the front panel 110 of the mounting plate 30 and define an angle 84 relative to a ground G (shown in FIG. 4) upon which the wheels 54 contact. The ground G is not limited to an outdoor ground surface, but can include any such surface that the wheels are in contact with such as a floor, pavement, grass, or any such surface. In some embodiments, the angle 84 between the legs 64 of the handle 62 and the ground G is between 5 and 45 degrees. In other embodiments, the angle 84 between the legs 64 of the handle 62 and the ground G is between 15 and 35 degrees. In the illustrated embodiment, the angle 84 between the legs 64 of the handle 62 and the ground G is approximately 25 degrees. Nylon inserts 80 are received within the apertures of the front panel 110 and provide a bearing surface for the legs 64.

Figure 4:
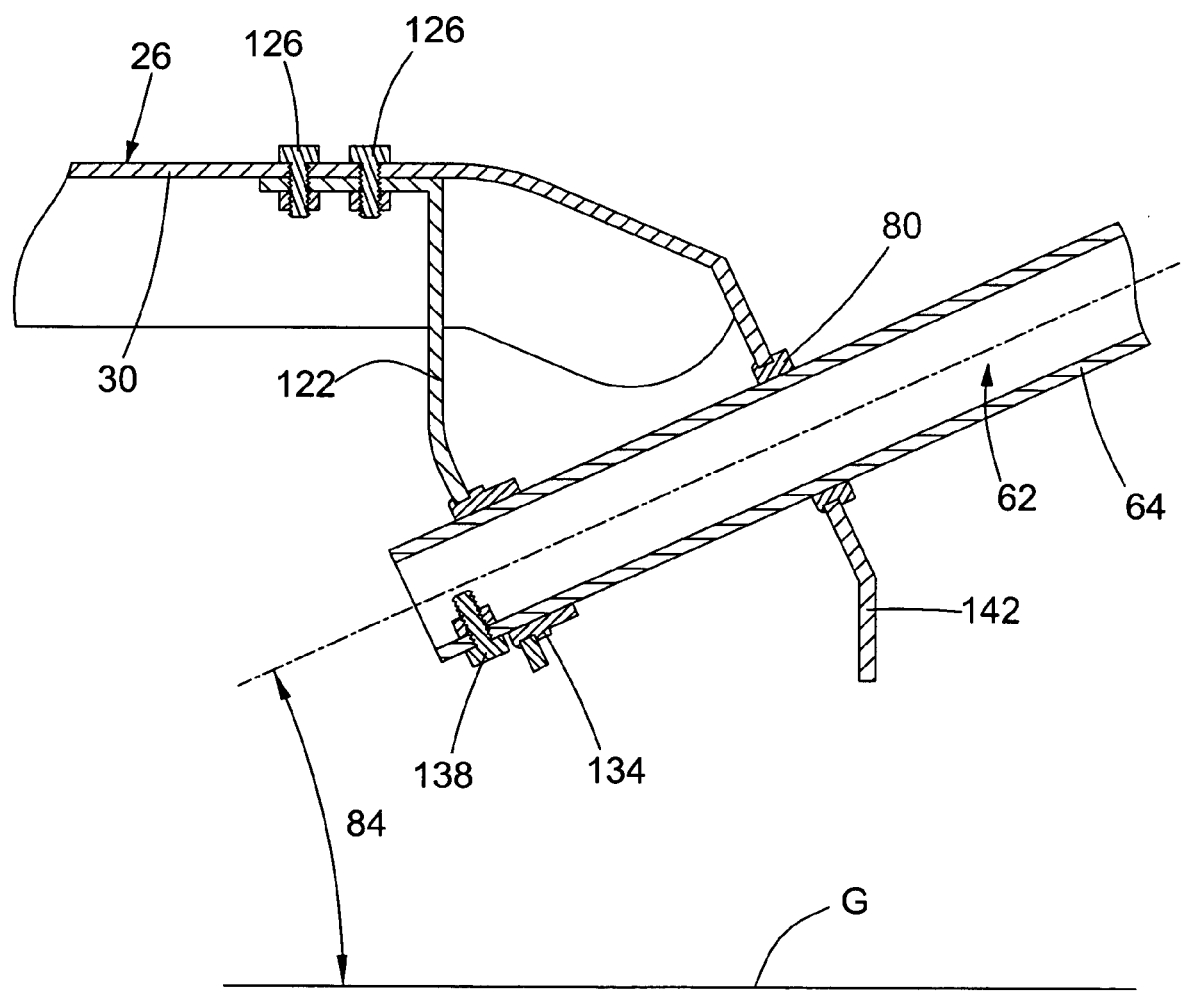
FIG. 4 is a cross-section view taken along line 4-4 in FIG. 1.

The handle 62 is movable between an extended position (shown in FIGS. 1-2 and 4) and a retracted position (shown in FIG. 3). As illustrated in FIG. 4, the handle 62 is supported by a set of mounting brackets 122 coupled to the mounting plate 30 by a pair of bolts 126. In other embodiments, any conventional fastener can be employed to secure the mounting brackets 122 to the mounting plate 30 as just described, such as screws, nails, rivets, pins, posts, clips, clamps, inter-engaging elements, and any combination of such fasteners. Alternatively, the mounting brackets 122 can be welded, press-fit, or formed with the mounting plate 30. The mounting brackets 122 are configured to allow the handle 62 to be extended and retracted through the front panel 110 and the mounting brackets 122 smoothly and without creating a torque on the mounting brackets 122 or the front panel 110.

As illustrated in FIG. 4, a sleeve 134 is coupled to each of the mounting brackets 122. The sleeves 134 are formed of nylon and are press-fit into apertures in the mounting brackets 122. The sleeves 134 provide another bearing surface for the legs 64. In other embodiments, the sleeves 134 can be fastened to the mounting bracket 122, or the sleeves 134 can be formed with the mounts 122 and made of the same material, or any variation thereof.

As illustrated in FIG. 4, a stop 138, such as a bolt, is inserted into an aperture of the leg 64 to stop the leg 64 in the extended position when the handle 62 slides from the retracted position to the extended position. The stops 138 contact the sleeves 134 when the handle 62 is in the extended position. In some embodiments, the sleeves 134 can be made of a material that is softer than that of the stop 138, to dampen the impact between the stops 138 and the sleeves 134.

As illustrated in FIGS. 1-3, the two feet 58 are coupled to each of the base portions 74 of the frame 10. The feet 58 do not rotate relative to the frame 10 for movement of the frame. However, the feet 58 may rotate relative to the frame during installation, cleaning, removal, or repair, but do not function to transport the frame 10. In alternative embodiments, the feet 58 can be integral extensions of the frame 10 or a portion of the frame 10 contacting the ground. The wheels 54 are mounted to axles 154 that extend through the vertical bumper arms 90.

Figure 5:
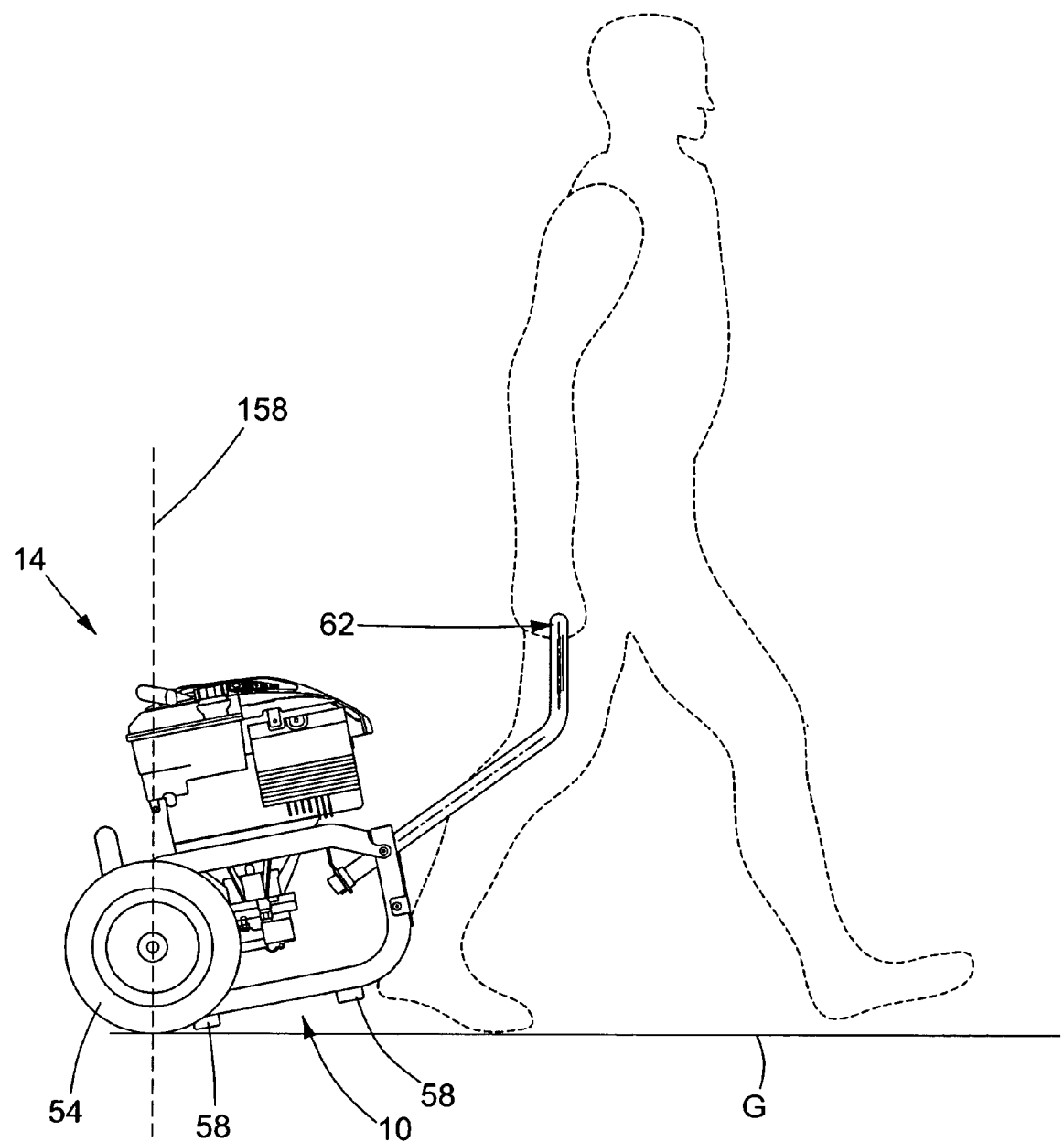
FIG. 5 is a side view of a user holding the handle of the portable frame supporting the engine-driven assembly shown in FIG. 1.

When the pressure washer 14 is at rest, the handle 62 is in the retracted position and the feet 58 are in contact with the ground G (shown in FIG. 3). When transporting the pressure washer 14, a user first grips the straight section 72 of the handle 62. As illustrated in FIG. 3, the user exerts a force F to move the handle 62 from the retracted position to the extended position at which point the stops 138 move into contact with sleeves 134 (shown in FIGS. 2 and 4). In the extended position, the user can then lift the handle 62 to pivot the frame 10 about the wheels thereby lifting the feet 58 out of contact with the ground (shown in FIG. 5). The wheels 54 are rotatable with respect to the frame about the axle 154 allowing the user to move the pressure washer 14 to a new location by rolling the pressure washer 14 on the wheels 54.

Because the pressure washer 14 is relatively low to the ground, it is advantageous to have an extendable handle 62 that is angled relative to the ground G such that the straight portion 72 used for gripping is located higher when the handle 62 is in the extended position than in the retracted position. In addition, it is also advantageous to raise the gripping portion 72 of the handle 62 from the legs 64 by an offset distance determined by the angle of the angled sections 76 of the cross-portion 68. The handle 62 allows a user to lift up the frame 10 from the ground G without bending down as far as would otherwise be required by a handle that extends horizontally (parallel to the ground). The handle 62 also allows a user to hold the handle 62 comfortably when the user is standing upright without tilting the pressure washer 14 as high as would otherwise occur with a horizontal handle (shown in FIG. 5). By reducing the magnitude of the tilt of the pressure washer 14, the user is less likely to tip the pressure washer 14 over backwards. In the tilted, raised position, the angled handle 62 maintains the center of gravity of the pressure washer 14 between the user and a plane 158 extending through the wheels 54 to avoid passing beyond the side of the plane 158 opposite the handle 62, where the pressure washer 14 is more likely to tip over. In contrast, lifting a horizontal handle to the standing-upright position may tilt the pressure washer 14 to a point where the center of gravity passes to the side of the wheels 54 opposite to the handle thereby potentially biasing the pressure washer 14 to tip over backwards.

Upon moving the pressure washer 14 to a new location, the user can lower the frame 10 such that the feet 58 return into contact with the ground. The handle 62 can then be returned to the retracted position by exerting a force F2 in the direction shown in FIG. 2.

The constructions and aspects described above and illustrated in the drawings are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the claims.

The invention claimed is:

1. An engine-driven assembly comprising:
   an engine-driven device;
   a vertical-shaft engine for supplying power to the engine-driven device;
   a frame coupled to at least one of the vertical-shaft engine and the engine-driven device, the frame having at least one frame foot in contact with a ground surface when the frame is in an operating position;
   a handle coupled to the frame having legs for movement of the handle between retracted and extended positions, wherein the legs define an axis, wherein the legs are configured to move in a direction parallel to the axis, and wherein the axis is oriented such that an acute angle is formed between the ground surface and the axis when the handle is extended and the engine-driven assembly is in the operating position; and
   a mounting bracket coupled to the frame, wherein the mounting bracket includes an aperture, wherein at least one of the legs is received by the aperture, and wherein the at least one of the legs is configured to directly engage and to be directly supported by the mounting bracket and to slide relative to the mounting bracket.

2. The assembly of claim 1, wherein the acute angle is between 15 and 35 degrees.

3. The assembly of claim 2, wherein the acute angle is approximately 25 degrees.

4. The assembly of claim 1, wherein the frame includes a mounting plate having first and second surfaces, the frame supporting the engine-driven device adjacent the first surface and supporting the vertical-shaft engine adjacent to the second surface.

5. The assembly of claim 4, wherein the mounting bracket is coupled to the first surface.

6. The assembly of claim 5, further comprising a stop on at least one of the legs, wherein the stop contacts a sleeve on the mounting bracket resisting extension of the handle beyond the extended position.

7. The assembly of claim 1, wherein the handle includes at least one bend resisting retraction of the handle beyond the retracted position.

8. The assembly of claim 7, wherein the bend in the handle is between about 115 and 145 degrees.

9. The assembly of claim 8, wherein the bend in the handle is approximately 130 degrees.

10. The assembly of claim 1, wherein the mounting bracket further includes a sleeve surrounding the aperture, wherein the sleeve is configured to directly engage and support the at least one of the legs to provide a bearing surface for the at least one of the legs to slide relative to the mounting bracket.

11. The assembly of claim 10, wherein the sleeve is formed of nylon.

12. The assembly of claim 1, wherein the frame includes a front panel having apertures through which the legs of the handle extend.

13. The assembly of claim 12, further comprising inserts received within the apertures of the front panel, the inserts receiving the legs of the handle.

14. The assembly of claim 13, wherein the inserts are made of nylon.

15. The assembly of claim 1, further comprising wheels rotatably mounted to the frame for supporting the vertical-shaft engine and the engine-driven device when the at least one frame foot is moved out of contact with the ground surface.

16. The assembly of claim 15, wherein the handle further comprises a gripping location, and wherein the vertical-shaft engine is substantially positioned between the wheels and the handle when the gripping location is held by an operator that is standing upright.

17. The assembly of claim 1, wherein the handle further comprises a gripping location, wherein there is a distance between the gripping location and the frame, and wherein the distance increases as the handle is moved from the retracted position to the extended position.

18. The assembly of claim 1, wherein the handle is movable between the retracted position and the extended position along a linear path.

19. The assembly of claim 1, wherein the at least one frame foot does not rotate with respect to the frame.

20. The assembly of claim 1, wherein the engine-driven assembly is a pressure washer.

21. The assembly of claim 1, wherein the engine-driven assembly is a portable electrical generator.

22. An engine-driven assembly comprising:
    an engine-driven device;
    a vertical-shaft engine for supplying power to the engine-driven device;
    a frame coupled to at least one of the vertical-shaft engine and the engine-driven device, the frame having at least one frame foot in contact with a ground surface when the frame is in an operating position;
    a handle coupled to the frame having legs for movement of the handle between retracted and extended positions, wherein the legs define an axis, wherein the legs are configured to move in a direction parallel to the axis, wherein the axis is oriented such that an acute angle is formed between the ground surface and the axis when the handle is extended and the engine-driven assembly is in the operating position, and wherein the frame includes a front panel having apertures through which the legs of the handle extend; and
    mounting brackets coupled to the frame, wherein the mounting brackets include second apertures, wherein the legs extend through the second apertures, wherein the first apertures of the front panel and the second apertures of the mounting brackets are coaxially aligned and configured to allow the legs to be extended and retracted through the front panel and the mounting brackets, and wherein the front panel and the mounting brackets support the legs.

23. The assembly of claim 22, further comprising nylon sleeves, wherein the first apertures in the front panel and the second apertures in the mounting brackets receive the nylon sleeves, and wherein the nylon sleeves are configured to directly engage and support the legs to provide bearing surfaces for the legs to slide relative to the mounting brackets and the front panel.

* * * * *

UNITED STATES PATENT AND TRADEMARK OFFICE
CERTIFICATE OF CORRECTION

PATENT NO. : 7,604,246 B2 Page 1 of 1
APPLICATION NO. : 11/159890
DATED : October 20, 2009
INVENTOR(S) : Sodemann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1154 days.

Signed and Sealed this

Fifth Day of October, 2010

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 7,604,246 B2 |
| APPLICATION NO. | : 11/159890 |
| DATED | : October 20, 2009 |
| INVENTOR(S) | : Wesley C. Sodemann and Billy Brandenburg |

It is certified that error appears in the above-identified patent and that said Letters Patent is hereby corrected as shown below:

On the Title page, item [54] and Column 1, line 1;

(54) Replace "FRAME FOR AN VERTICAL SHAFT ENGINE-DRIVEN ASSEMBLY" with
--FRAME FOR AN ENGINE-DRIVEN ASSEMBLY--.

Signed and Sealed this
Twenty-eighth Day of December, 2010

David J. Kappos
*Director of the United States Patent and Trademark Office*